US 8,555,580 B2

(12) United States Patent
Vilasineekul (10) Patent No.: US 8,555,580 B2
(45) Date of Patent: Oct. 15, 2013

(54) MULTIPURPOSE HOLDOWN

(75) Inventor: Kashane Vilasineekul, Marysville, OH (US)

(73) Assignee: Simpson Strong-Tie Co., Inc., Pleasanton, CA (US)

( * ) Notice: Subject to any disclaimer, the term of this patent is extended or adjusted under 35 U.S.C. 154(b) by 413 days.

(21) Appl. No.: 12/346,733

(22) Filed: Dec. 30, 2008

(65) Prior Publication Data

US 2010/0166497 A1 Jul. 1, 2010

(51) Int. Cl.
*E02D 5/74* (2006.01)
*E02D 5/80* (2006.01)

(52) U.S. Cl.
USPC ............... 52/295; 52/293.3; 52/696; 52/702; 52/715

(58) Field of Classification Search
USPC ............... 52/696, 702, 698, 712, 714, 293.3, 52/293.1, 295, 294, 715
See application file for complete search history.

(56) References Cited

U.S. PATENT DOCUMENTS

| | | | |
|---|---|---|---|
| 478,163 A * | 7/1892 | Lehman | 403/190 |
| 573,452 A | 12/1896 | Delahunt | |
| 622,028 A | 3/1899 | Welz | |
| 828,488 A * | 8/1906 | Lanz | 29/897.3 |
| 874,514 A * | 12/1907 | Lindow | 403/190 |
| 967,107 A | 8/1910 | Cook et al. | |
| 1,335,617 A | 3/1920 | Solomon | |
| 1,406,723 A * | 2/1922 | Caldwell | 403/232.1 |
| 1,503,148 A | 7/1924 | Bernstrom | |
| 1,578,947 A | 3/1926 | Alber | |
| 1,704,593 A | 3/1928 | Downing | |
| 1,696,288 A | 12/1928 | Underwood | |
| 1,806,607 A | 5/1931 | Brown | |
| 2,169,474 A | 8/1939 | Penderson | |
| 2,227,713 A | 1/1941 | Higgins | |
| 2,321,221 A * | 6/1943 | Linehan | 403/230 |
| 2,454,739 A | 11/1948 | Henderson | |
| 2,871,069 A | 1/1959 | Weber | |
| 3,036,347 A * | 5/1962 | Findleton | 403/217 |
| 3,413,773 A | 12/1968 | Fitzgerald | |
| D224,083 S | 7/1972 | Gilb | |
| 3,972,169 A * | 8/1976 | Sheppard, Jr. | 52/702 |
| D248,275 S * | 6/1978 | Gilb | D8/380 |
| 4,096,677 A | 6/1978 | Gilb | |

(Continued)

FOREIGN PATENT DOCUMENTS

DE 1205686 11/1959
DE 9312522 2/1994

(Continued)

OTHER PUBLICATIONS

Lin, Jin-Jie, U.S. Appl. 12/311,770, Office Action dated Nov. 30, 2011.

(Continued)

*Primary Examiner* — Phi A
(74) *Attorney, Agent, or Firm* — James R. Cypher; Charles R. Cypher (57) ABSTRACT

A connection made with a multi-purpose connector that can act as a holdown or tension tie and transfer tension, uplift, or lateral load, between a minimum nominal 2×4" wood framing member and a ½" diameter anchor. The anchor may be tied to a concrete foundation, another connector of the same type, a wood framing member, or other supporting members.

23 Claims, 5 Drawing Sheets

(56) References Cited

U.S. PATENT DOCUMENTS

| | | | |
|---|---|---|---|
| 4,192,118 A * | 3/1980 | Gilb | 52/714 |
| 4,199,908 A | 4/1980 | Teeters | |
| 4,291,996 A * | 9/1981 | Gilb | 403/14 |
| 4,321,776 A | 3/1982 | Delight | |
| 4,367,864 A | 1/1983 | Eldeen | |
| 4,387,543 A | 6/1983 | Tschan et al. | |
| 4,411,548 A * | 10/1983 | Tschan | 403/232.1 |
| 4,480,941 A * | 11/1984 | Gilb et al. | 403/232.1 |
| 4,530,194 A | 7/1985 | Linton et al. | |
| 4,587,788 A | 5/1986 | Bielicki | |
| 4,603,531 A | 8/1986 | Nash | |
| 4,614,070 A | 9/1986 | Idland | |
| 4,665,672 A * | 5/1987 | Commins et al. | 52/295 |
| 4,717,279 A * | 1/1988 | Commins | 403/187 |
| 4,744,192 A * | 5/1988 | Commins | 52/714 |
| 4,825,621 A * | 5/1989 | Jensen | 52/702 |
| 4,841,690 A * | 6/1989 | Commins | 52/105 |
| 4,869,467 A | 9/1989 | Kellison | |
| 4,875,314 A | 10/1989 | Boilen | |
| 4,890,436 A | 1/1990 | Colonias | |
| 4,924,648 A | 5/1990 | Gilb et al. | |
| 4,995,206 A | 2/1991 | Colonias et al. | |
| 5,092,097 A * | 3/1992 | Young | 52/295 |
| 5,104,252 A | 4/1992 | Colonias et al. | |
| 5,150,982 A * | 9/1992 | Gilb | 403/232.1 |
| 5,157,883 A * | 10/1992 | Meyer | 52/357 |
| 5,203,817 A | 4/1993 | Klumpjan | |
| 5,212,919 A | 5/1993 | Shaw et al. | |
| 5,249,404 A * | 10/1993 | Leek et al. | 52/702 |
| 5,253,465 A * | 10/1993 | Gilb | 52/643 |
| 5,301,485 A | 4/1994 | Shaw et al. | |
| 5,303,520 A | 4/1994 | Gozdziak | |
| 5,307,603 A | 5/1994 | Chiodo | |
| 5,317,850 A * | 6/1994 | Colonias et al. | 52/293.3 |
| 5,333,435 A | 8/1994 | Leek | |
| 5,364,214 A | 11/1994 | Fazekas | |
| 5,375,384 A | 12/1994 | Wolfson | |
| 5,380,116 A | 1/1995 | Colonias | |
| 5,384,993 A | 1/1995 | Phillips | |
| 5,410,854 A | 5/1995 | Kimmell et al. | |
| 5,467,569 A | 11/1995 | Chiodo | |
| 5,467,570 A | 11/1995 | Leek | |
| 5,501,048 A | 3/1996 | Nakanishi | |
| 5,531,054 A | 7/1996 | Ramirez | |
| 5,535,561 A | 7/1996 | Schuyler | |
| 5,540,530 A | 7/1996 | Fazekas | |
| 5,560,156 A * | 10/1996 | McDonald | 52/92.2 |
| 5,570,549 A | 11/1996 | Lung et al. | |
| 5,575,130 A | 11/1996 | Chiodo | |
| 5,603,580 A * | 2/1997 | Leek et al. | 403/232.1 |
| 5,666,774 A | 9/1997 | Commins | |
| 5,680,673 A | 10/1997 | Beshore | |
| 5,706,626 A | 1/1998 | Mueller | |
| D399,013 S | 9/1998 | Nguyen | |
| 5,813,181 A | 9/1998 | Ashton et al. | |
| 5,816,281 A | 10/1998 | Mixon | |
| 5,832,679 A | 11/1998 | Roth | |
| 5,901,525 A | 5/1999 | Doeringer et al. | |
| 5,913,181 A | 6/1999 | Ezell | |
| 5,979,130 A | 11/1999 | Gregg et al. | |
| 5,987,828 A | 11/1999 | Hardy | |
| 6,006,487 A | 12/1999 | Leek | |
| 6,015,138 A | 1/2000 | Kohlberger et al. | |
| 6,067,769 A | 5/2000 | Hardy | |
| 6,112,495 A | 9/2000 | Gregg et al. | |
| 6,141,928 A | 11/2000 | Platt | |
| 6,158,188 A * | 12/2000 | Shahnazarian | 52/702 |
| 6,295,780 B1 * | 10/2001 | Thompson | 52/712 |
| 6,327,831 B1 | 12/2001 | Leek | |
| 6,327,985 B1 | 12/2001 | Frenkler et al. | |
| 6,513,290 B2 | 2/2003 | Leek | |
| 6,523,321 B1 * | 2/2003 | Leek et al. | 52/702 |
| 6,550,200 B1 | 4/2003 | Mueller | |
| 6,668,508 B2 | 12/2003 | Boone et al. | |
| 6,715,258 B1 | 4/2004 | Mueller | |
| 6,835,036 B2 | 12/2004 | Paul | |
| 6,840,020 B2 * | 1/2005 | Leek et al. | 52/712 |
| 7,014,383 B2 * | 3/2006 | Schmid et al. | 403/231 |
| 7,296,386 B2 | 11/2007 | Leek | |
| 7,334,372 B2 * | 2/2008 | Evans et al. | 52/289 |
| 7,503,148 B2 * | 3/2009 | Lin | 52/643 |
| 7,707,785 B2 * | 5/2010 | Lin | 52/92.2 |
| 7,788,873 B2 * | 9/2010 | Leek | 52/702 |
| 7,913,472 B2 * | 3/2011 | Troth et al. | 52/696 |
| 2001/0002529 A1 | 6/2001 | Commins et al. | |
| 2003/0029124 A1 | 2/2003 | Wise | |
| 2003/0093969 A1 | 5/2003 | Saldana | |
| 2003/0213194 A1 | 11/2003 | Kawai et al. | |
| 2006/0032165 A1 | 2/2006 | Griffith | |
| 2006/0213136 A1 | 9/2006 | Lin | |
| 2007/0107338 A1 | 5/2007 | Daudet | |
| 2010/0031601 A1 | 2/2010 | Lin | |

FOREIGN PATENT DOCUMENTS

| | | |
|---|---|---|
| GB | 422765 | 1/1935 |
| WO | WO 2008/048261 A2 | 4/2008 |
| WO | WO 2008/048261 A3 | 4/2008 |

OTHER PUBLICATIONS

"HD Holdown." Simpson Strong-Tie Co., Inc. catalog, 1966, p. 13.
"HD Holdown." Simpson Strong-Tie Co., Inc. catalog, 1967, p. 13.
"HD Holdown." Simpson Strong-Tie Co., Inc. catalog, 1968, p. 9.
"HD Holdown." Simpson Strong-Tie Co., Inc. catalog, 1970, p. 16.
"HDN Holdowns." "HD Holdown." Simpson Strong-Tie Co., Inc. catalog, 1979, p. 5.
"HD/HDN Holdowns." Simpson Strong-Tie Co., Inc. catalog, 1983, p. 7.
"HAD Holdowns." Connectors for Wood Construction, Simpson Strong-Tie Co., Inc. catalog, 1986, p. 7 and cover.
"HAD/HD Holdowns." Connectors for Wood Construction, Simpson Strong-Tie Co., Inc. catalog, 1990, p. 9 and cover.
"HAD/HD Holdowns." Simpson Strong-Tie Co., Inc. catalog, 1993, p. 13.
"ES Report PFC-5929. TJ-Shear Panel." ICBG Evaluation Service, Inc. Whittier, California. Reissued Nov. 1, 2002.
Wood Construction Connectors, Catalog C-2000, Simpson Strong-Tie Co., Inc. Pleasanton, CA p. 31-36 and cover (1999).
"USP Lumber Connectors PHD and UPHD Series Hold-downs," ES Report ER-2830, ICBO Evaluation Service, Inc, Whittier, CA (Oct. 1, 2001).
"Hardy Frame, Hardy Frame Heavy Duty, 18-inch Hardy Braced Frame and Hardy Frame Screw," Evaluation Report PFC-5342, ICBO Evaluation Service, Whittier, CA (Sep. 1, 1999).
"Descriptions and Typical Installation Details. The Hardy Frame. Based on ICBO Approval #PFC-5342," Simplified Structural Systems, Ventura CA, p. H-1-H4 (Dec. 1, 1999).
"The Hardy Frame," The Hardy Frame, Publisher Unknown (US) p. 1-4 (received in 1997).
"Simplified Structural Systems. Makers of the Hardy Frame." Product brochure. Simplified Structural Systems, Ventura, CA (received Jan. 13, 2000).
"Recommendations for the 18" Hardy Frames, Simplified Structural Systems, Ventura, CA, 3 pages (received Jan. 13, 2000).
Tanaka, "House Materials," Product Catalog 2003. Tanaka Co, Ltd. Japan. p. 82 (2003).
BMF-Simpson GmbH, "Staische Werte," BMF-Simpson GmbH (Syke, Germany) p. 54 (2002).
Hughes Manufacturing, Inc. "Product Catalog 1996/1997" Heavy Hold Downs, Hughes Manufacturing, Inc. (Lagro, FL) front and back p., and p. 41 (1996).
Southeastern Metals Manufacturing Co., Inc., "Construction Hardware" Southeastern Metals Manufacturing Co, Inc. (Jacksonville, FL) front and back page, and p. 38 (1991).
Simpson Strong-Tie Company, Inc. "Wood Construction Connectors," Catalog C-2002, Simpson Strong-Tie Company, Inc. (USA) front and back page, and p. 17 (2001).
Simpson Strong-Tie Company, Inc. "Wood Construction Connectors," Catalog C-2004, Simpson Strong-Tie Company, Inc. (USA)

(56) References Cited

OTHER PUBLICATIONS front and back page, and pp. 26-314, 34-38, 44, 45,58, 59, 128, 141, and 157 (2001).

Simpson Strong-Tie Company, Inc., "Wood Construction Connectors," Catalog C-96, Simpson Strong-Tie Company, Inc (USA), front and back cover pages, and p. 32 (1995).

* cited by examiner

MULTIPURPOSE HOLDOWN

BACKGROUND OF THE INVENTION

This invention relates to a sheet metal connector for anchoring an anchored structural member to an anchoring structural member. The connector works in conjunction with a separate anchor member that is received by or is attached to the anchoring structural member and with fasteners for attaching the connector to the anchored structural member.

Earthquake, hurricanes, tornadoes and floods impose forces on a building that can cause structural failure. To counteract these forces, it has become common practice to strengthen or add ties between the structural members of a building in areas where such cataclysmic forces may be imposed. For example: framed walls can be attached to the foundation rather than merely rest upon it; connections between the framed walls of each floor can be strengthened; and joists can be connected to both their headers and the walls that support the headers. One of the most common connectors designed for this application is called a holdown by the inventor. Holdowns are commonly used to anchor framed walls to the foundation.

Early holdowns were formed from two or more separate pieces of metal welded together. These holdowns had to be painted to prevent rusting. They were heavy and costly to produce.

State of the art holdowns are made from galvanized sheet metal formed on progressive die machines that require no welding or painting. See U.S. Pat. No. 4,665,672 granted May 19, 1987 to Commins, Gilb and Littleton; U.S. Pat. No. 5,092,097 granted Mar. 3, 1992 to Young; U.S. Pat. No. 5,249,404 granted Oct. 5, 1993 to Leek and Commins; and U.S. Pat. No. 6,327,831 granted Dec. 11, 2001 to Leek. These advancements have reduced to cost of making holdowns while increasing their ability to withstand tension forces. However, recent severe earthquakes in San Francisco, Los Angeles and Kobe, Japan demonstrate that holdowns capable of being mass produced and installed inexpensively should be made even stronger for many connections.

Generally, holdown connectors that work in conjunction with a separate anchor member and attach to only one face of the anchored structural member—generally a vertically-disposed stud—work in a common fashion. The anchor member attaches at the seat of the connector. This seat is connected to a pair of side members that are, in turn, connected to a pair of back members. The back members attach to the anchored structural member. Most holdown connectors have side members to increase the strength of the connector or to connect the seat member to the back member.

The connector of the present invention works in a similar fashion to most of the prior art holdowns, such that it is amenable to standard installation practices. The connector of the present invention improves on the prior art by incorporating a number of design features that make it lighter and cheaper to produce while withstanding high tension loads.

SUMMARY OF THE INVENTION

The present invention is a connection made with a multipurpose connector that can act as a holdown or tension tie and transfer tension, uplift, or lateral load, between a minimum nominal 2×4" wood framing member and a ½" diameter anchor. The anchor may be tied to a concrete foundation, another connector of the same type, a wood framing member, or other supporting members.

The connector of the present invention improves on the prior art by combining a set of design features to achieve loads comparable to connectors made from much heavier sheet metal. Connectors made from much heavier sheet metal are several times more expensive to make and are also more expensive to ship, not to mention relatively wasteful of both sheet metal in manufacturing and fuel in shipping.

The connector of the present invention can be fastened to a single nominal 2×4" or larger joist, which makes it ideal as a tension tie in a floor system or as a connector in a guardrail assembly. The connector is preferably fastened with self-drilling wood screws and connects to a ½" diameter bolt, a foundation anchor, or a heavy duty screw anchor for concrete and masonry.

The connector of the present invention is preferably made from 14 gauge ASTM A653 GR33, G90 sheet steel. It is preferably fastened to the anchored structural member with 8 Simpson Strong-Drive ¼"×1½" self-drilling wood screws (preferably installed with a low speed high torque drill with a ⅜" hex head driver). The anchor member is preferably a ½" diameter steel threaded rod, ASTM A307 or A36 minimum. Preferably, a standard, cut washer (1⅜" outside diameter) is installed between the anchor member and the seat member.

In one preferred embodiment, the connector of the present invention is installed horizontally, with the seat member perpendicular to the ground. The anchored structural member is a wood deck joist and the anchoring structural member is a nominal 4×4" deck guardrail post. The anchor member preferably is a ½" diameter HDG (hot dip galvanized) machine bolt or threaded rod.

In another preferred embodiment, the connector of the present invention is installed vertically, with the seat member parallel to the ground. The anchored structural member is a double nominal 2×4" wood wall post and the anchoring structural member is a concrete foundation that supports the wall post, either directly or with an intervening mudsill.

DETAILED DESCRIPTION OF THE INVENTION

Figure 8:
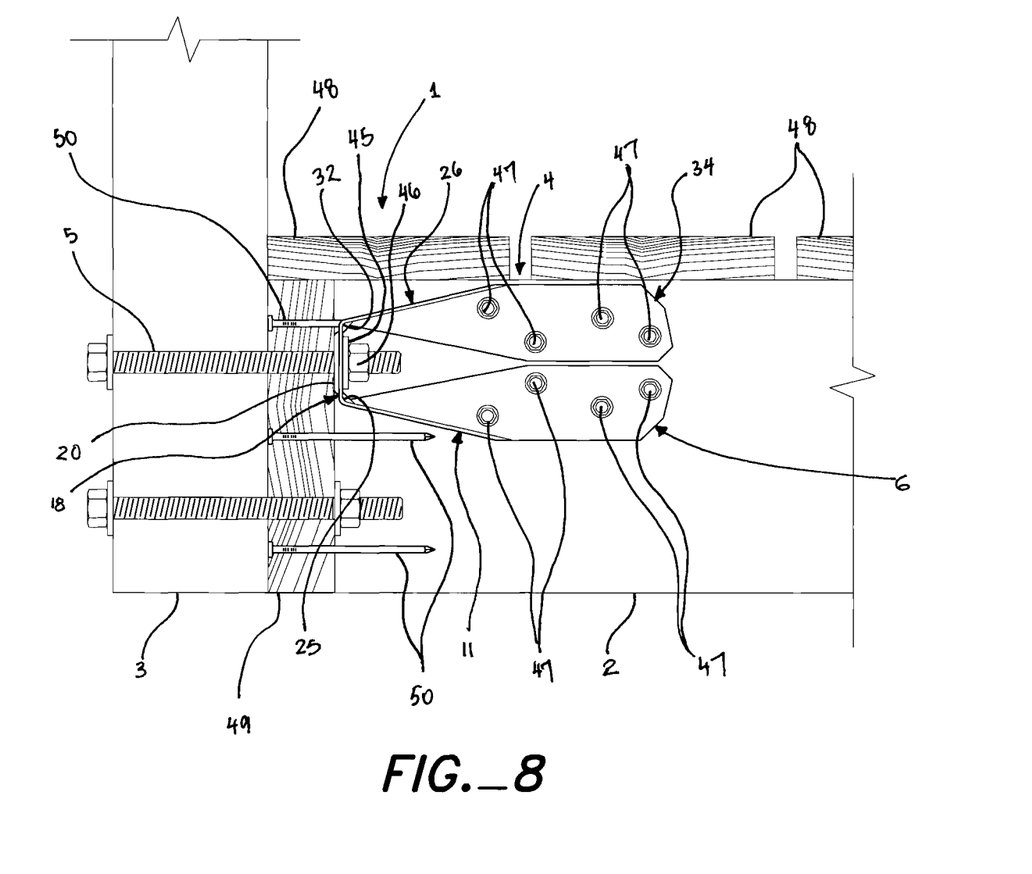
FIG. 8 is a sectional front elevation view of the tension tie building connection of the present invention.

As shown in FIG. 8, the present invention is a building connection 1 that comprises an anchored structural member 2 attached to a sheet metal connector 4, an anchoring structural member 3 that hold an anchor member 5, the sheet metal connector 4 and the anchor member 5. The sheet metal connector 4 is fastened to the anchored structural member 2 and is anchored to the anchoring structural member 3 by the anchor member 5. The anchor member 5 is restrained by the anchoring structural member 3. The sheet metal connector 4 comprises a first back member 6, a first side member 11, a seat member 18, a second side member 26, and a second back member 34. The terminology "anchored" and "anchoring" for the structural members 2 and 3 is not intended to exclude the possibility of connecting a pair of the sheet metal connectors 4 of the present invention with an anchor member 5 that is held in tension between the paired sheet metal connectors 4, as in a floor-to-floor or purlin-to-purlin connection.

Figure 1:
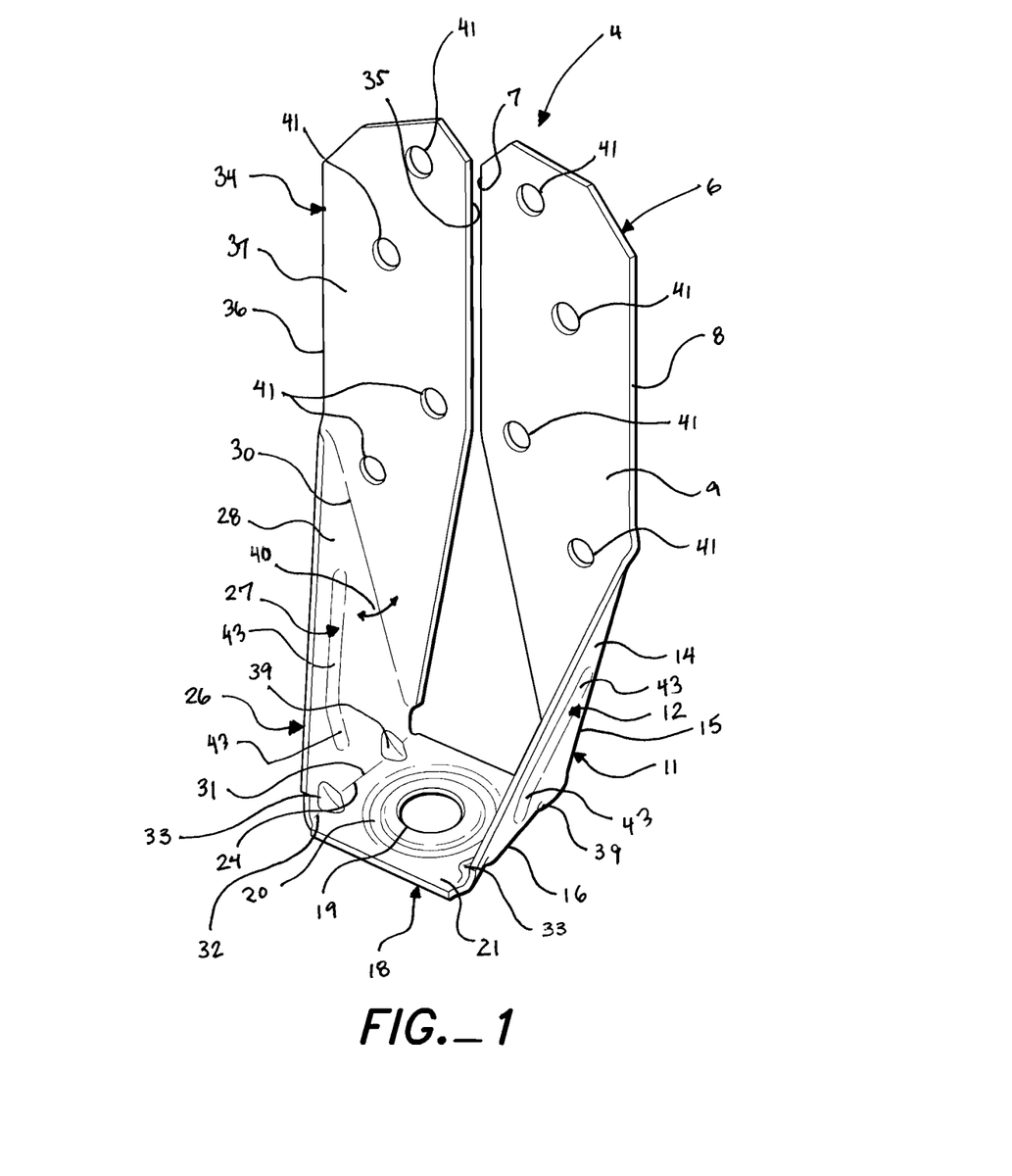
FIG. 1 is a perspective view of the sheet metal connector of the present invention.
Figure 2:
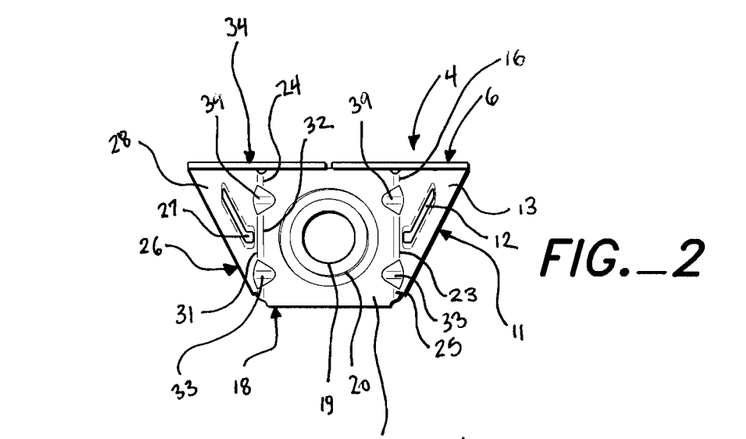
FIG. 2 is a top plan view of the sheet metal connector of the present invention.
Figure 3:
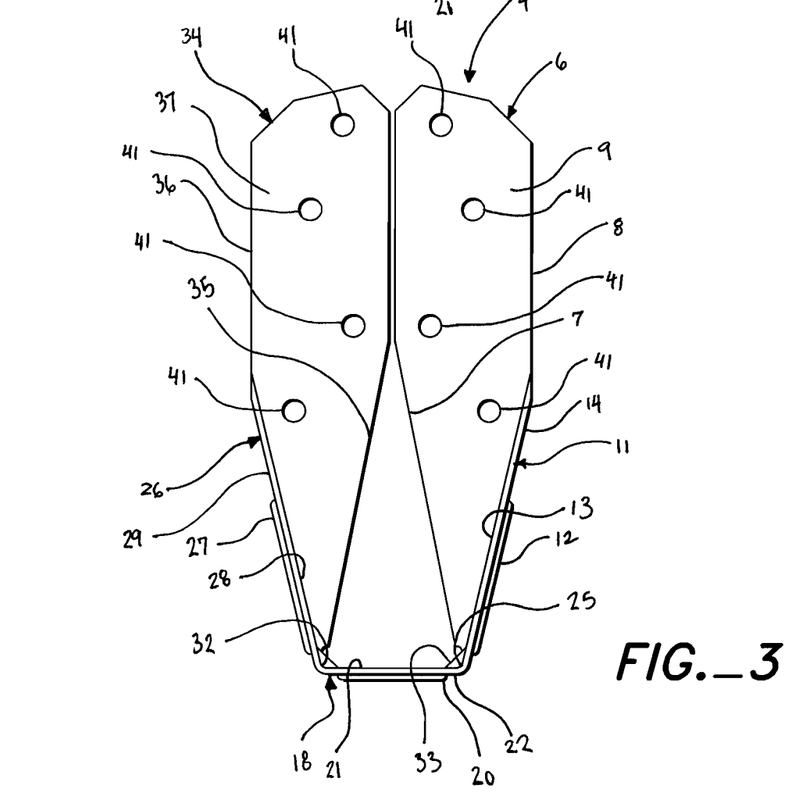
FIG. 3 is a front elevation view of the sheet metal connector of the present invention.
Figures 4, 5, 6:
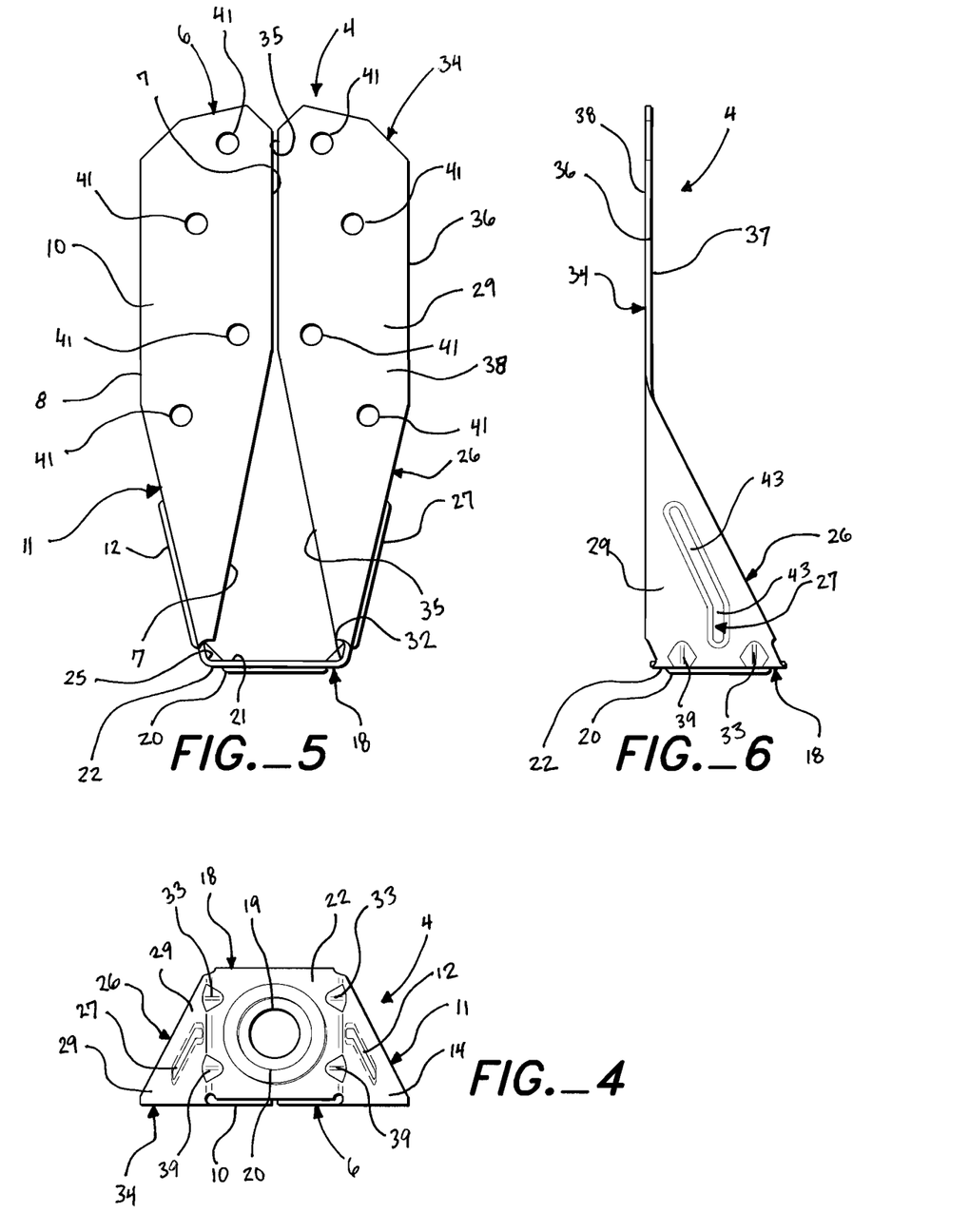
FIG. 4 is a bottom plan view of the sheet metal connector of the present invention.
FIG. 5 is a rear elevation view of the sheet metal connector of the present invention.
FIG. 6 is a left side elevation view of the sheet metal connector of the present invention. The right side of the sheet metal connector of the present invention is a mirror-image of the left side.
Figure 7:
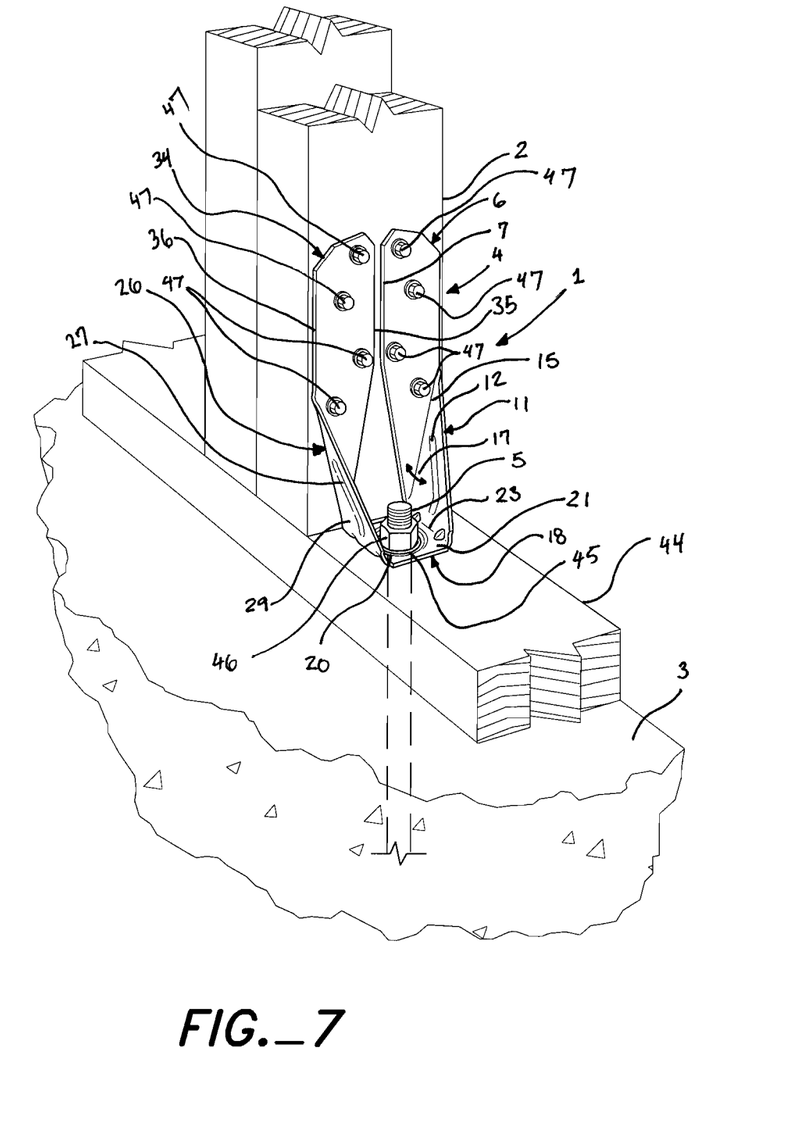
FIG. 7 is a is a perspective view of the holdown building connection of the present invention.

As shown in FIGS. 1, 2, 3, 4 and 7, the first back member 6 has an inner side edge 7, an outer side edge 8, an inner surface 9 and an outer surface 10. The first side member 11 has a stiffening embossment 12, an inner surface 13, an outer surface 14, a back edge 15 and a bottom edge 16. As shown in FIGS. 1, 3 and 7, the back edge 15 of the first side member 11 is integrally connected to the outer side edge 8 of the first back member 6 at an angle 17 less than 180 degrees between the inner surface 13 of the first side member 11 and the inner surface 9 of the first back member 6. As shown in FIGS. 1, 2 and 4, the seat member 18 has an anchor member receiving opening 19 reinforced by a circumferential embossment 20, an upper surface 21, a lower surface 22, a first side edge 23 and a second side edge 24. As shown in FIGS. 2 and 3, the first side edge 23 of the seat member 18 is integrally connected to the bottom edge 16 of the first side member 11 at a first juncture 25 greater than 90 degrees between the upper surface 21 of the seat member 18 and said inner surface 13 of the first side member 11. The first juncture 25 is reinforced with a first gusset 33. The second side member 26 has a stiffening embossment 27, an inner surface 28 facing the inner surface 13 of the first side member 11, an outer surface 29, a back edge 30 and a bottom edge 31. The bottom edge 31 of the second side member 26 is integrally connected to the second side edge 24 of the seat member 18 opposite the first side member 11 at a second juncture 32 greater than 90 degrees between the upper surface 21 of the seat member 18 and the inner surface 28 of the second side member 26. The second juncture 32 is reinforced with a first gusset 33. As shown in FIGS. 1 and 5, the second back member 34 has an inner side edge 35, an outer side edge 36, an inner surface 37 and an outer surface 38. The outer side edge 36 of the second back member 34 is integrally connected to the back edge 30 of the second side member 26 at an angle 40 less than 180 degrees between the inner surface 28 of the second side member 26 and the inner surface 37 of the second back member 34. The outer side edge 36 of the second back member 34 faces away from the outer side edge 8 of the first back member 6.

The sheet metal connector 4 is preferably made from cold-formed 14 gauge galvanized sheet steel.

Preferably, the first side edge 23 of the seat member 18 is integrally connected to the bottom edge 16 of the first side member 11 at a first juncture 25 of between 95 and 110 degrees between the upper surface 21 of the seat member 18 and the inner surface 13 of the first side member 11. Preferably, the bottom edge 31 of the second side member 26 is integrally connected to the second side edge 24 of the seat member 18 opposite the first side member 11 at second juncture 32 of between 95 and 110 degrees between the upper surface 21 of the seat member 18 and the inner surface 28 of the second side member 26.

Preferably, the first side edge 23 of the seat member 18 is integrally connected to the bottom edge 16 of the first side member 11 at a first juncture 25 of 103 degrees between the upper surface 21 of the seat member 18 and the inner surface 13 of the first side member 11. Preferably, the bottom edge 31 of the second side member 26 is integrally connected to the second side edge 24 of the seat member 18 opposite the first side member 11 at second juncture 32 of 103 degrees between the upper surface 21 of the seat member 18 and the inner surface 28 of the second side member 26.

The stiffening embossment 12 in the first side member 11 preferably is elongated and embossed into the inner surface 13 of the first side member 11 to a depth equal to the thickness of the first side member. The stiffening embossment 27 in the second side member 26 preferably is elongated and embossed into the inner surface 28 of the second side member 26 to a depth equal to the thickness of the first side member.

As shown in FIGS. 1 and 6, the stiffening embossment 12 is the first side member 11 preferably has two straight, angularly-related linear segments 43. The stiffening embossment 27 in the second side member 26 also preferably has two straight, angularly-related linear segments 43.

Preferably, the circumferential embossment 20 in the seat member 18 is circular and embossed into the upper surface of 21 of the seat member 18 to a depth equal to thickness of the seat member 18.

As shown in FIG. 4, the first juncture 24 preferably is reinforced by a first gusset 33 and a second gusset 39, and the second juncture 32 preferably is also reinforced by a first gusset 33 and a second gusset 39.

Preferably, the first back member 6 has four fastener openings 41 arranged in a zig-zag pattern; and the second back member 34 has four fastener openings 41 arranged in a zig-zag pattern. Preferably, the fastener openings 41 are each 0.265 inches in diameter.

The seat member 18 is preferably 1⅝ inches wide from the first side member 11 to the second side member 26. Preferably, the anchor member receiving opening 19 is 0.612 inches in diameter.

When the anchored structural member 2 is a single wood nominal 2×4", the building connection 1 preferably achieves a tension load of 1850 pounds before failing. When the anchored structural member 2 is a double wood nominal 2×4", the building connection 1 preferably achieves a tension load of 2000 pounds before failing.

When the connector 4 of the present invention is a holdown 4, the anchored structural member 2 is vertically-oriented. Preferably, the anchored structural member 2 is a wall stud 2. The anchoring structural member 3 preferably is a concrete foundation 3 if the connector 4 is being used on the ground floor of a building. If the connector 4 is being used on an upper level of a building, the anchoring structural member 3 preferably is part of an upper floor structure. As shown in FIG. 7, the anchor member 5 may pass through a mudsill 44. The anchor member 5 preferably is restrained against the seat member 18 by a nut 46 and is reinforced by a washer 45. Preferably, a plurality of fasteners 47 secure the holdown 4 to the wall stud 2.

When the connector 4 of the present invention is a tension tie 4, the anchored structural member 2 is horizontally-oriented. Preferably, the anchored structural member 2 is a floor beam 2. The anchored structural member 2 preferably is a deck floor beam 2. Preferably, the anchoring structural member 3 is a deck post 3. Alternatively, the anchored structural member 2 is a roof beam 2 and the anchoring structural member 3 is a wall 3, not shown in the drawings. As shown in FIG. 8, the anchor member 5 may pass through a rim joist 49. The rim joist 49 is partially fastened to the floor beam 2 with a plurality of nails 50. The anchor member 5 preferably is restrained against the seat member 18 by a nut 46 and is reinforced by a washer 45. Preferably, a plurality of fasteners 47 secure the tension tie 4 to the deck floor beam 2 which is surmounted by a plurality of deck boards 48.

Testing of the Present Invention

The connector 4 of the present invention was tested for the applicant by Testing Engineers, Inc. (TEI) in two rounds of testing. The test data is summarized below:

| Simpson Test #P525 - Connector | | | |
|---|---|---|---|
| | Measured Value | Measure or Witnessed by | How sample was obtained |
| Model: MPHD Drawing No. PROTOTYPE 5 Rev: B Date: Jun. 10, 2008 | — | — | Fabricated by Simpson Strong-Tie at the manufacturing plant located in Stockton, CA, USA |
| | Conforms to drawing | Vertified by TEI | |
| Connector Material: ASTM A653 GR33 ($Fy_{min}$ = 33 ksi ksi $Fu_{min}$ = 45 ksi) | $Fy_{act}$ = 38.2 ksi $Fu_{act}$ = 50.8 ksi | Worthington Steel | |
| Thickness: 14 Ga. | 0.072" | Base Metal Thickness TEI Lab #X110 | |
| Finish: G90 | 0.075" | Overall Thickness measured by TEI | |

| Simpson Test #P525 - Fastener | | | | | | |
|---|---|---|---|---|---|---|
| Location | Quantity & Type | Measured Diameter (in.) | Measured Length (in.) | Lot # & Fyb (psi) | Measured or Witnessed by | How sample was obtained |
| Face | (8) SDS ¼" × 1½" | 0.2455 | 1.522 | | Witnessed by TEI | Stock at R&D Lab |
| Anchor | (1) ½" Dia. HS ATR w/ ½" cut washer | 0.4905 | 8 | — | Witnessed by TEI | |

| Simpson Test #P525 - Members | | | | | |
|---|---|---|---|---|---|
| Member | Species and Grade | Size (in.) | Measured Moisture Content (average %) | Measured or Witnessed by | How sample was obtained |
| Post | DFL | 2 × 4 | 11.1 | Witnessed by TEI | Stock at R&D Lab |
| Foundation | Steel N.A. | 2 × 3 × 18 | — | Witnessed by TEI | |

| Simpson Test #P525 - Test Data | | | |
|---|---|---|---|
| | Load (lbs.) | | |
| Applied Load | TEST A | TEST B | TEST C |
| PRELOAD | — | — | — |
| LOAD AT AVERAGE ¼" DEFLECTION | 2666 | 2823 | 3362 |
| ULTIMATE LOAD | 5168 | 5349 | 7583 |
| FAILURE MODE | Wood Split Screws Withdrawal | Wood Split Screws Withdrawal | Part Tore |
| TOTAL ELAPSED TIME TO ULTIMATE (min) | 5.80 | 4.16 | 5.21 |

| | Load (lbs.) | | |
|---|---|---|---|
| Applied Load | TEST D | TEST E | TEST F |
| PRELOAD | — | — | — |
| LOAD AT AVERAGE ¼" DEFLECTION | 3457 | 3046 | 2999 |
| ULTIMATE LOAD | 6648 | 7035 | 6796 |
| FAILURE MODE | Part Tore | Part Tore | Part Tore |
| TOTAL ELAPSED TIME TO ULTIMATE (min) | 4.17 | 5.08 | 4.60 |

| Simpson Test #P525 - Test Limit | |
|---|---|
| ALLOWABLE STRESS | Lbs. |
| Average value at ¼" deflection of 6 tests/1.4 | 2185 |
| Average ultimate of 6 tests/3 - Safety Factor | 2143 |
| Average ultimate load of 6 tests | 6430 |
| Test Procedure: | ICC AC155 & TEI SOP 20.160 |
| Test Machine: | MTS200 |
| Load Cell: | 25K-186583A |
| Load Rate: | 0.200 in/min |
| Measuring Devices: | LVDTs: #1013 & #1014 |

| Simpson Test #P648 - Connector | | | |
|---|---|---|---|
| | Measured Value | Measure or Witnessed by | How sample was obtained |
| Model: MPHD | — | — | Fabricated by Simpson Strong-Tie at the manufacturing plant located in Stockton, CA, USA |
| Drawing No. PROTOTYPE 5 Rev: B Date: Jun. 10, 2008 | Conforms to drawing | Vertified by TEI | |
| Connector Material: ASTM A653 GR33 ($Fy_{min}$ = 33 ksi ksi $Fu_{min}$ = 45 ksi) | $Fy_{act}$ = 38.2 ksi $Fu_{act}$ = 50.8 ksi | Worthington Steel | |
| Thickness: 14 Ga. | 0.072" | Base Metal Thickness TEI Lab #X110 | |
| Finish: G90 | 0.0795" | Not verified by TEI | |

| Simpson Test #P648 - Fastener | | | | | | |
|---|---|---|---|---|---|---|
| Location | Quantity & Type | Measured Diameter (in.) | Measured Length (in.) | Lot # & Fyb (psi) | Measured or Witnessed by | How sample was obtained |
| Face | (8) SDS ¼" × 1½" | 0.2500 | 1.510 | | Witnessed by TEI | Stock at R&D Lab |
| Anchor | (1) ½" Dia. HS ATR w/ ½" cut washer | 0.5050 | 8 | — | Witnessed by TEI | |

| Simpson Test #P648 - Members | | | | | |
|---|---|---|---|---|---|
| Member | Species and Grade | Size (in.) | Measured Moisture Content (average %) | Measured or Witnessed by | How sample was obtained |
| Post | DFL | 2 × 4 | 13.3 | Witnessed by TEI | Stock at R&D Lab |
| Foundation | Steel N.A. | 2 × 3 × 18 | — | Witnessed by TEI | |

| Simpson Test #P648 - Test Data | | | |
|---|---|---|---|
| | Load (lbs.) | | |
| Applied Load | TEST A | TEST B | TEST C |
| PRELOAD | — | — | — |
| LOAD AT AVERAGE ¼" DEFLECTION | 2834 | 3040 | 3080 |
| ULTIMATE LOAD | 5850 | 6229 | 4832 |
| FAILURE MODE | Post Split | Post Split | Post Split |
| TOTAL ELAPSED TIME TO ULTIMATE (min) | 4.10 | 4.15 | 4.12 |
| | Load (lbs.) | | |
| Applied Load | TEST D | TEST E | TEST F |
| PRELOAD | — | — | — |
| LOAD AT AVERAGE ¼" DEFLECTION | 3152 | 2998 | 2863 |
| ULTIMATE LOAD | 4740 | 6442 | 4782 |
| FAILURE MODE | Post Split | Post Split | Post Split |
| TOTAL ELAPSED TIME TO ULTIMATE (min) | 3.19 | 4.63 | 3.72 |

| Simpson Test #P648 - Test Limit | |
|---|---|
| ALLOWABLE STRESS | Lbs. |
| Average value at ¼" deflection of 6 tests/1.4 | 2139 |
| Average ultimate of 6 tests/3 - Safety Factor | 1826 |
| Average ultimate load of 6 tests | 5479 |
| Test Procedure: | ICC AC155 & TEI SOP 20.155 |
| Test Machine: | MTS200 |
| Load Cell: | 25K-186583A |
| Load Rate: | 0.200 in/min |
| Measuring Devices: | LVDTs: #1013 & #1014 |

I claim:

1. A building connection (1) comprising:

(a) an anchored structural member (2);

(b) an anchoring structural member (3);

(c) a sheet metal connector (4) fastened to said anchored structural member (2) and anchored to said anchoring structural member (3) by an anchor member (5) restrained by said anchoring structural member (3), said connector (4) comprising:

i. a first back member (6) having an inner side edge (7), an outer side edge (8), an inner surface (9) and an outer surface (10), said outer surface (10) lying in registration with said anchored structural member (2)

and connected thereto by a plurality of fasteners (47), all portions of said outer surface (10) immediately adjacent said fasteners (47) lying in registration with said anchored structural member (2);

ii. a first side member (11) having an inner surface (13), an outer surface (14), a back edge (15) and a bottom edge (16), said back edge (15) of said first side member (11) being integrally connected to said outer side edge (8) of said first back member (6) at an angle (17) less than 180 degrees between said inner surface (13) of said first side member (11) and said inner surface (9) of said first back member (6);

iii. a seat member (18) having an anchor member receiving opening (19) receiving said anchor member (5) therethrough with said anchor member (5) connected to said anchoring structural member (3) and said anchoring structural member disposed on said side of said seat member (18) away from said first back member (6) and said first side member (11) with a nut (46) connected to said anchor member (5) and disposed on said side of said seat member (18) away from said anchoring structural member (3), an upper surface (21), a lower surface (22), a first side edge (23) and a second side edge (24), said first side edge (23) of said seat member (18) being integrally connected to said bottom edge (16) of said first side member (11) at a first juncture (25) greater than 90 degrees between said upper surface (21) of said seat member (18) and said inner surface (13) of said first side member (11);

iv. a second side member (26) having an inner surface (28) facing said inner surface (13) of said first side member (11), an outer surface (29), a back edge (30) and a bottom edge (31), said bottom edge (31) of said second side member (26) being integrally connected to said second side edge (24) of said seat member (18) opposite said first side member (11) at second juncture (32) greater than 90 degrees between said upper surface (21) of said seat member (18) and said inner surface (28) of said second side member (26);

v. a second back member (34) having an inner side edge (35), an outer side edge (36), an inner surface (37) and an outer surface (38), a substantial portion of said outer surface (38) lying in registration with said anchored structural member (2) and connected thereto by a plurality of fasteners (47), said outer side edge (36) of said second back member (34) being integrally connected to said back edge (30) of said second side member (26) at an angle (40) less than 180 degrees between said inner surface (28) of said second side member (26) and said inner surface (37) of said second back member (34), said outer side edge (36) of said second back member (34) facing away from said outer side edge (8) of said first back member (6) and wherein;

vi. a portion of said first back member (6) extends past said first side edge (23) of said seat member (18) and at least one of said plurality of fasteners (47) connects said portion to said anchored structural member (2);

vii. a portion of said first back member (6) overlies said seat member (18) and at least one of said plurality of fasteners (47) connects said portion to said anchored structural member (2);

viii. a portion of said second back member (34) extends past said second side edge (24) of said seat member (18) and at least one of said plurality of fasteners (47) connects said portion to said anchored structural member (2); and ix. a portion of said second back member (34) overlies said seat member (18) and at least one of said plurality of fasteners (47) connects said portion to said anchored structural member (2).

2. The building connection (1) of claim 1, wherein:
(a) said sheet metal connector (4) is made from cold-formed 14 gauge galvanized sheet steel and said first and second back members (6 and 34) and said first and second side members (11 and 26) are substantially planar members, and wherein:
   (b) said first and second side members (11) have stiffening embossments (12 and 27);
   (c) said anchor member receiving opening (19) of said seat member (18) is reinforced by a circumferential embossment (20);
   (d) said first and second junctures (25 and 32) of said seat member (18) are reinforced with first gussets (33);
   (e) said anchored structural member (2) is formed from at least one wood 2×4; and
   (f) said building connection (1) achieves a tension load of at least 1850 pounds before failing.

3. The building connection (1) of claim 2, wherein:
(a) said first side edge (23) of said seat member (18) is integrally connected to said bottom edge (16) of said first side member (11) at a first juncture (25) of between 95 and 110 degrees between said upper surface (21) of said seat member (18) and said inner surface (13) of said first side member (11); and
(b) said bottom edge (31) of said second side member (26) is integrally connected to said second side edge (24) of said seat member (18) opposite said first side member (11) at second juncture (32) of between 95 and 110 degrees between said upper surface (21) of said seat member (18) and said inner surface (28) of said second side member (26).

4. The building connection (1) of claim 3, wherein:
(a) said first side edge (23) of said seat member (18) is integrally connected to said bottom edge (16) of said first side member (11) at a first juncture (25) of 103 degrees between said upper surface (21) of said seat member (18) and said inner surface (13) of said first side member (11); and
(b) said bottom edge (31) of said second side member (26) is integrally connected to said second side edge (24) of said seat member (18) opposite said first side member (11) at second juncture (32) of 103 degrees between said upper surface (21) of said seat member (18) and said inner surface (28) of said second side member (26).

5. The building connection (1) of claim 2 wherein:
(a) said stiffening embossment (12) in said first side member (11) is elongated and embossed into said inner surface (13) of said first side member (11) to a depth equal to the thickness of said first side member; and
(b) said stiffening embossment (27) in said second side member (26) is elongated and embossed into said inner surface (28) of said second side member (26) to a depth equal to the thickness of said first side member.

6. The building connection (1) of claim 5, wherein:
(a) said stiffening embossment (12) is said first side member (11) has two straight, angularly-related linear segments (43); and
(b) said stiffening embossment (27) in said second side member (26) has two straight, angularly-related linear segments (43).

7. The building connection (1) of claim 2, wherein:
(a) said circumferential embossment (20) in said seat member (18) is circular and embossed into said upper surface of (21) of said seat member (18) to a depth equal to thickness of said seat member (18).

8. The building connection (1) of claim 1 wherein:
(a) said first juncture (25) is reinforced by a first gusset (33) and a second gusset (39); and
(b) said second juncture (32) is reinforced by a first gusset (33) and a second gusset (39).

9. The building connection (1) of claim 1, wherein:
(a) said first back member (6) has four fastener openings (41) arranged in a zig-zag pattern; and
(b) said second back member (34) has four fastener openings (41) arranged in a zig-zag pattern.

10. The building connection (1) of claim 9, wherein:
(a) said fastener openings (41 and 42) are each 0.265 inches in diameter.

11. The building connection (1) of claim 3, wherein:
(a) said seat member (18) is 1⅝ inches wide from said first side member (11) to said second side member (26).

12. The building connection (1) of claim 11, wherein:
(a) said anchor member receiving opening (19) is 0.612 inches in diameter.

13. The building connection (1) of claim 1, wherein:
(a) said sheet metal connector (4) is made from cold-formed 14 gauge galvanized sheet steel, and wherein:
(b) said first and second side members (11) have stiffening embossments (12 and 27);
(c) said anchor member receiving opening (19) of said seat member (18) is reinforced by a circumferential embossment (20);
(d) said first and second junctures (25 and 32) of said seat member (18) are reinforced with first gussets (33);
(e) said anchored structural member (2) is a double wood 2×4; and
(f) said building connection (1) achieves a tension load of 2000 pounds before failing.

14. The building connection (1) of claim 1, wherein:
(a) said anchored structural member (2) is vertically-oriented.

15. The building connection (1) of claim 2, wherein:
(a) said anchored structural member (2) is a wall stud (2).

16. The building connection (1) of claim 13, wherein:
(a) said anchoring structural member (3) is a concrete foundation (3).

17. The building connection (1) of claim of claim 13, wherein:
(a) said anchoring structural member (3) is part of an upper floor structure.

18. The building connection (1) of claim 1, wherein:
(a) said anchored structural member (2) is horizontally-oriented.

19. The building connection (1) of claim 16, wherein:
(a) said anchored structural member (2) is a floor beam (2).

20. The building connection (1) of claim 17, wherein:
(a) said anchored structural member (2) is a deck floor beam (2).

21. The building connection (1) of claim 18, wherein:
(a) said anchoring structural member (3) is a deck post (3).

22. The building connection (1) of claim 17, wherein:
(a) said anchored structural member (2) is a roof beam (2).

23. The building connection (1) of claim 20, wherein:
(a) said anchoring structural member (3) is a wall (3).

* * * * *